May 28, 1968     G. P. MICHEL     3,386,058

INDUCTIVE ASSEMBLY WITH SUPPORTING MEANS

Filed Nov. 21, 1966     2 Sheets-Sheet 1

WITNESSES
Theodore F. Wrobel
James F. Young

INVENTOR
George P. Michel
BY
Donald R. Lackey
ATTORNEY

May 28, 1968     G. P. MICHEL     3,386,058
INDUCTIVE ASSEMBLY WITH SUPPORTING MEANS
Filed Nov. 21, 1966     2 Sheets-Sheet 2

United States Patent Office 3,386,058
Patented May 28, 1968

3,386,058
INDUCTIVE ASSEMBLY WITH SUPPORTING MEANS
George P. Michel, Sharpsville, Pa., assignor to Westinghouse Electric Corporation, Pittsburgh, Pa., a corporation of Pennsylvania
Filed Nov. 21, 1966, Ser. No. 595,725
12 Claims. (Cl. 336—60)

This invention relates in general to winding assemblies for electrical inductive apparatus, such as transformers, and more particularly to new and improved methods of bracing electrical winding assemblies which have a plurality of concentrically disposed coils.

An electrical conductor carrying current in a magnetic field is acted upon by a mechanical force, which, as expressed by Ampere's law, is directly proportional to the length of the electrical conductor, the magnitude of the current, and the strength of the magnetic field. Since this mechanical force on the electrical conductors of electrical power apparatus is considerable, especially during short circuit conditions, special bracing of the conductors is necessary.

In an electrical transformer, the electrical coils produce a magnetic field when current flows therethrough. The magnetic fields produced by concentrically disposed high and low voltage coils are equal in magnitude and opposite in direction, but they do not completely cancel as the coils do not occupy the same space. The resultant field generates a repulsion force between the high and low voltage coils, which is theoretically perpendicular to the winding axis of the coils. In practice, however, the electrical centers of the coils are displaced from one another in an axial direction, due to non-uniform and non-linear distribution of ampere turns per unit length. This axial displacement of the electrical centers of the coils is due to normal manufacturing tolerances, taps on the coils, and any other irregularities in the structure of the coils. Therefore, the force between the concentrically disposed coils has a component which is parallel with the axis of the coils, which tends to move the high voltage coils axially in one direction, and the low voltage coils axially in the opposite direction.

Conventionally, the concentrically disposed coils of electrical power transformers are braced against this axial component of force which tries to axially separate the coils, by wood blocks which are disposed to bridge the adjacent ends of the coils, at each end of the winding, with the wood blocks at opposite ends of the winding being tied together with tie rods. This approach, however, in addition to being costly, has been found to be inadequate on certain transformer ratings and designs, with the hereinbefore mentioned method of bracing the coils failing to prevent axial movement of the coils under short circuit tests applied to the windings after manufacture.

Accordingly, it is an object of the invention to provide new and improved bracing means for bracing the coils of an electrical transformer to prevent relative axial movement.

Another object of the invention is to provide new and improved bracing means for preventing axial separation of concentrically disposed electrical coils under short circuit conditions, which is more effective than prior art bracing means, and less costly to manufacture.

Briefly, the present invention accomplishes the above cited objects, by interleaving the high and low voltage coils which make up the electrical winding of the transformer, with a high strength strip of insulating material which is bonded to the winding structure. The strip of insulating material is interleaved with the coils such that an attempt to axially separate the high and low voltage coils will place the portion of the strip disposed between the coils in tension. For example, in a winding structure which includes a winding tube member, a low voltage coil disposed on the winding tube member, insulating means disposed about the low voltage coil, and a high voltage coil disposed about the insulating means, a strip of insulating material, according to the teachings of the invention, would be bonded to the winding tube members, the insulating means disposed between the coil assemblies, and to the outside surface of the high voltage coil assembly.

Further objects and advantages of the invention will become apparent from the following detailed description, taken in connection with the accompanying drawings, in which.

Figure 1:
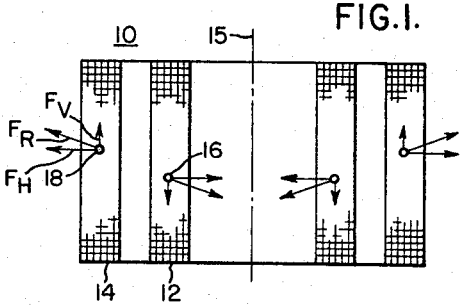
FIGURE 1 is a diagrammatic representation of the concentrically disposed coils of an electrical transformer, illustrating the mechanical forces acting thereon.

Referring now to the drawings, and FIG. 1 in particular, there is shown a diagrammatic representation of a winding assembly 10, for a transformer of the type which has concentrically disposed low and high voltage coils, 12 and 14, respectively. Low and high voltage coils 12 and 14 each have an opening for receiving a magnetic core (not shown), and they are disposed in concentric, adjacent, spaced relation about winding axis 15, which is the center line of the opening in the coils.

The electrical centers 16 and 18 of coils 12 and 14, respectively, are the points which divide the ampere turns of each coil into two equal portions. The electrical centers of coils 12 and 14 are axially displaced from one another, due to non-uniformities in the distribution of the ampere turns across the coils, which may be caused by many factors. For example, taps on the coils, manufacturing tolerances, and other irregularities in the coil structure all contribute to move the electrical centers of the coils away from their mechanical centers. Therefore, instead of a repulsion force between electrical centers which is perpendicular to the coil axis 15, the force between the coils is at some angle other than 90° with respect to the winding axis of the coils. The total repulsion force between the coils is illustrated in FIG. 1 as vector $F_R$, which produces a component of force $F_H$ which is perpendicular to winding axis 15, and a component of force $F_V$ which is parallel with the winding axis 15. Thus, coils 12 and 14 are forced axially apart when current flows therethrough, with the mechanical forces becoming very large during short circuit conditions. The axial direction in which the force is exerted on each coil depends upon the relative axial locations of the electrical centers of the coils. For example, in FIG. 1 the electrical centers are shown displaced such that the electrical center of coil 14 is closer to the upper end of the coils than the electrical center of coil 12. Since the electrical centers are forced axially apart, the force on coil 14 is upward and the force on coil 12 is downward. If the relative axial locations of coils 12 and 14 were to be reversed, the force on coil 12 would be upward, and the force on coil 14 would be downward.

While the forces between the coils has been illustrated in FIG. 1 by using two coils, the same general principles apply to winding structures having a plurality of adjacent, concentric high and low voltage coils, and the invention applies generally to electrical inductive apparatus having any number of concentrically disposed coils.

More specifically, the invention broadly comprises a new and improved arrangement for bracing concentrically disposed transformer coils against the axial forces applied to the coils, by using tape, or strip, formed of electrical insulating material, which is interleaved with the winding structure. The interleaving arrangement described by the strip of insulating material is such that any force which tends to axially separate the coils will place the tape disposed between the coils in tension, with the tape being bonded to the winding assembly to prevent any relative movement between the tape and the immediately adjacent portion of the winding assembly.

Figure 2:
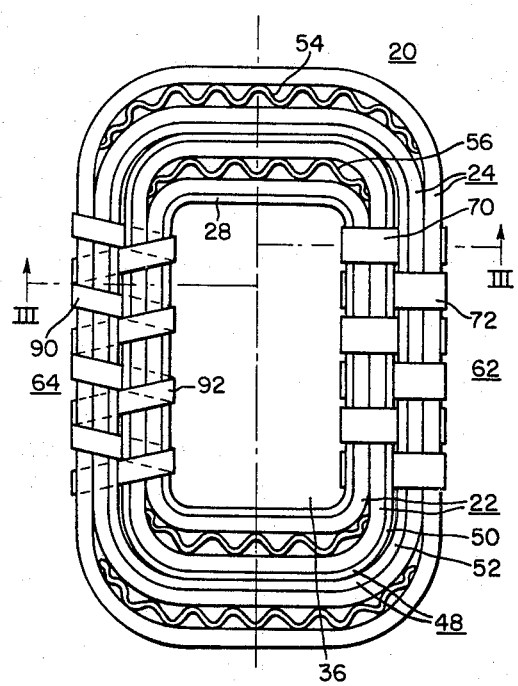
FIG. 2 is a plan view of an electrical winding structure constructed according to the teachings of the invention.
Figure 3:
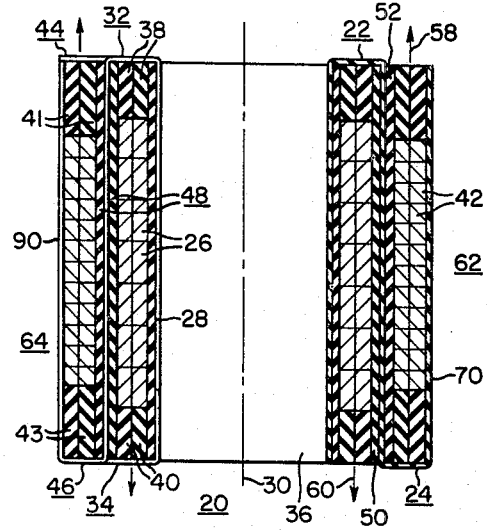
FIG. 3 is a sectional view of the winding structure shown in FIG. 3, taken along the line III—III.

An example of an electrical winding structure which may utilize the teachings of the invention is shown in FIGS. 2 and 3, with FIG. 2 being a plan view of a winding assembly 20 for an electrical transformer, and FIG. 3 being a cross sectional view of FIG. 2, taken along the line III—III.

Winding assembly 20 includes low and high voltage coil assemblies 22 and 24, respectively, disposed in concentric adjacent relation. Low voltage coil assembly 22 includes a plurality of conductor turns 26, disposed about a winding tube member 28 having an axis 30, which forms a coil assembly having first and second ends 32 and 34, respectively, an opening 36 which extends between its ends, and inner and outer major opposed surfaces.

Collar members 38 and 40, formed of electrical insulating members, are disposed at ends 32 and 34 respectively, of low voltage coil assembly 22.

High voltage coil assembly 24 includes a plurality of conductor turns 42, wound about axis 30, which forms a coil assembly having first and second ends 44 and 46, respectively, an opening which extends between its ends, which corresponds to opening 36 shown in FIGS. 2 and 3, and inner and outer major opposed surfaces. Insulating collar members 41 and 43 are disposed at opposite ends of the coil assembly. The high voltage coil assembly 24 is disposed in spaced, adjacent, concentric relation with low voltage coil assembly 22, with its inner major surface spaced from the outer major surface of low voltage coil assembly 22, which forms a space or channel between the two coil assemblies in which high-low insulation 48 is disposed. High-low insulation 48 may be formed of pressboard members, or any other suitable electrical insulating material, and is preferably divided radially into two equal sections 50 and 52, for purposes which will be hereinafter explained.

Winding assembly 20 may be formed progressively, by winding low voltage coil assembly 22 on winding tube member 28, placing the high-low insulation 48 about the outer major surface of low voltage coil assembly 22, and then winding high voltage coil assembly 24 over the high-low insulation. Or, the various coil assemblies and insulating structures may be separately formed and then telescoped into the proper relationship. Also, winding assembly 20 may be substantially rectangular in its plan view cross section, as illustrated in FIG. 2, having duct formers, such as those shown at 54 and 56, disposed at certain sides of the winding for cooling purposes, or the winding assembly may have a substantially round, oval, or any other suitable plan view cross section.

Regardless of the configuration of the winding assembly, the concentrically disposed high and low voltage coils 24 and 22, respectively, will be subjected to forces which will tend to move the high voltage winding in one direction, such as in the direction of arrow 58, and the low voltage coils will tend to move in the opposite direction, such as in the direction of arrow 60. This invention discloses how these axial forces may be overcome, to hold the coil assemblies in the desired assembled relation without axial movement of the coils, even during short circuit conditions.

In general, the invention comprises the interleaving of the coil assemblies with a tape or strip formed of an electrical insulating material, which is bonded to the winding assembly with a suitable adhesive. The interleaving is performed with the objective of placing the tape or strip which extends between opposite ends of the coil assemblies, and hence between opposite ends of the winding assembly 20, through the channel occupied by the high-low insulation 48. Thus, mechanical forces which tend to axially separate the coil assemblies will place the tape in tension, and the tape will prevent movement of the coil assemblies.

FIGS. 2 and 3 illustrate two different interleaving arrangements which will accomplish this objective. Since, in this instance, two of the sides of winding assembly 20 contain cooling ducts, the tape is disposed on the remaining sides 62 and 64 of the winding assembly, in order to prevent the tape from interfering with the cooling of the winding assembly. A first embodiment of the invention is illustrated on side 62, and a second embodiment of the invention is illustrated on side 64, of winding assembly 20.

In general, the first embodiment of the invention comprises a basic interleaving arrangement which will be called the first basic pattern, in which the tape or strip starts at one end of winding assembly 20, adjacent one of the major external surfaces of the winding, which may be the inner surface of low voltage coil assembly 22, or the outer surface of high voltage coil assembly 24, it crosses this major external surface to the other end of the winding, it loops back to the starting end of the winding through the channel formed between the coil assemblies, arriving at the remaining major external surface of the winding assembly, and then it crosses this major external surface to the opposite end of the winding.

Figure 6:
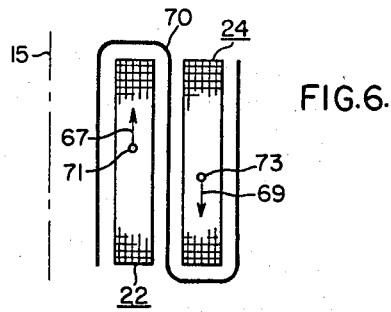
FIGS. 6 and 7 are diagrammatic representations of the embodiment of the invention shown in FIG. 4.

FIG. 3 illustrates a cross section through tape or strip 70, clearly showing this first basic pattern. More specifically, tape 70 starts at the lower end of winding assembly 20, it crosses the major external surface of winding assembly 20, which in this instance is the surface of the winding assembly adjacent the inner surface of low voltage coil assembly 22, it crosses over the upper or first end 32 of low voltage coil assembly 22 and loops through the channel occupied by the high-low insulation 48, arriving back at the lower end of the winding assembly, it crosses end 46 of high voltage coil assembly 24, and then crosses the remaining major external surface of the winding, which in this instance is adjacent the outer surface of high voltage coil assembly 24, to the upper end of the winding assembly 20. This arrangement of tape 70 is also shown diagrammatically in FIG. 6. As shown in FIG. 6, this arrangement of the tape is especially suited for restraining forces in the directions shown by the arrows 67 and 69, which would be the case when electrical centers 71 and 73 are displaced as shown.

Figure 7:
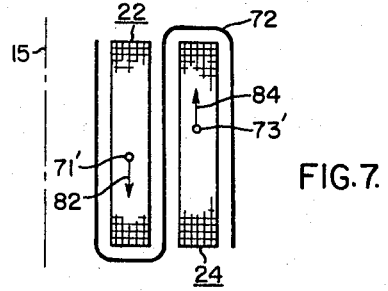

The immediately adjacent strip of insulating material or tape 72, which is spaced from tape 70, also follows the first basic pattern, but instead of starting at the lower end of winding assembly 20, it starts at the upper end of the winding assembly adjacent the first end 32 of low voltage coil assembly 22. Thus, the interleaving configuration followed by tape members 70 and 72 resembles the letter S, with one of the letters being a mirror image of the other. The arrangement of the tape shown in FIG. 7 is especially suited for restraining forces in the directions of arrows 82 and 84, which would be the case when the electrical centers 71' and 73' are axially displaced as shown in FIG. 7.

This arrangement of tapes 70 and 72 may then be repeated by any number of additional lengths of tape, with the actual number of interleaved tapes utilized depending upon the magnitude of the vertical forces to be overcome.

In addition to being interleaved with the coil assemblies in the first basic pattern, the tape or strip of insulating material must be bonded to winding assembly 20. Thus, as shown in FIGS. 2 and 3, the tape would be bonded to winding tube 28, to the high-low insulation 48, and to the outer surface of high voltage winding 24. It has been found desirable to form the high-low insulation 48 of two radial sections 50 and 52, with the tape interleaving the two sections and being bonded thereto.

The tape or strip of electrical insulating material utilized should have a high strength in tension, such as the commercially available woven glass tapes, and it may be of any suitable thickness and width, determined by the particular application and the forces to be resisted. Several superposed layers of tape may be used if necessary, in order to obtain the desired strength.

The tape is bonded to the winding assembly by a suitable adhesive. One convenient way to obtain this result is to use tape which has been impregnated with an epoxy, polyester, or other suitable adhesive, with the adhesive being in the "B" or non-tacky stage. Then, after the winding assembly is completed and the tape disposed in its desired interleaved position, the winding assembly is heated to drive out the moisture. The adhesive in the tape will then soften and flow slightly under influence of the heat, and will harden and provide an excellent bond between the tape and immediately adjacent, contacting portions of winding assembly 20.

Figure 4:
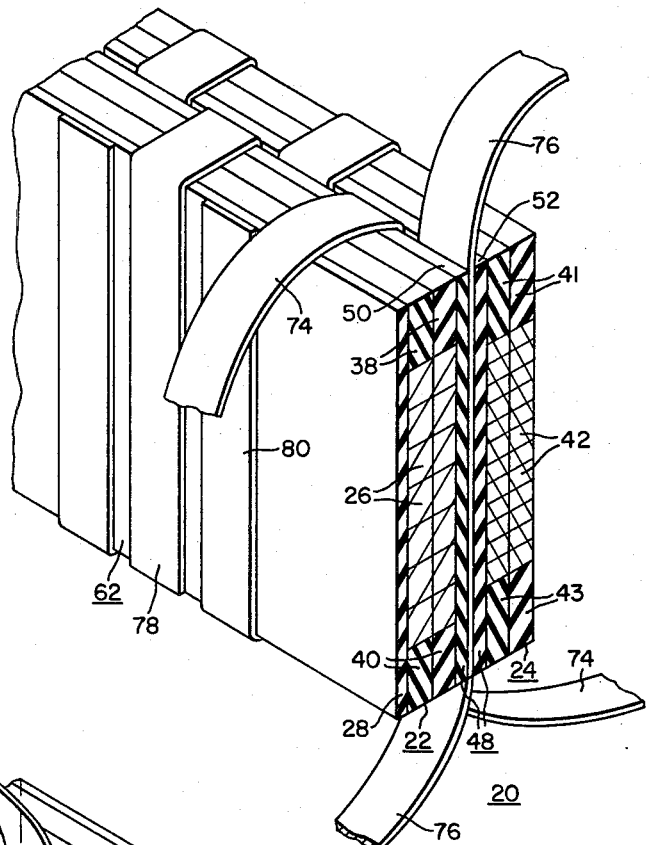
FIG. 4 is a pictorial view of a portion of the winding assembly shown in FIGS. 2 and 3, illustrating an embodiment of the invention.

FIG. 4 is a pictorial view of a portion of winding assembly 20, illustrating how the strips of electrical insulating material may be disposed, either while the winding assembly is being wound, if formed progressively by continuous winding techniques, or while the winding is being assembled in sub-sections.

If winding assembly 20 is progressively wound, after low voltage coil 22 has been wound and the first half 50 of high-low insulation 48 has been placed, predetermined lengths of tape or strips of insulating material, such as strips 74 and 76, are placed in position, and the winding completed. After the winding assembly has been completed, the extending ends of the strips may be simply pulled over opposite sides of the winding assembly, with strips 74 and 76 then having the finished appearance of strips 78 and 80, respectively.

If winding assembly 20 is formed in sub-sections and telescoped into the proper adjacent, concentric relation, the strips of insulating material may be pre-placed between the sections of high-low insulation 48, and high-low insulation 48 may then be telescoped over low voltage coil assembly 22, or the first section 50 of high-low insulation 48 may be telescoped over low voltage coil assembly 22, and the strips may be placed, and then the second section 52 of high-low insulation 48 may be telescoped into assembled position.

Instead of using tape which has been pre-impregnated with adhesive, the adhesive may also be applied wet at the time of placing the strips in the assembly.

Another embodiment of the invention is shown in FIGS. 2 and 3, on side 64 of winding assembly 20. This embodiment of the invention also utilizes the first basic interleaving pattern hereinbefore described, but adds to the first basic pattern a second basic pattern. In general, the tape or strip starts at one end of the winding assembly, which will be called the first end, adjacent one of the major external surfaces of the winding assembly, which will be called the first external surface, it crosses the first major external surface to the second end of the winding assembly, it loops through the channel formed between the coil assemblies back to the first end of the winding, and it crosses the second major external surface to the second end of the winding assembly. This completes the first basic pattern hereinbefore described. The tape or strip then continues by looping back through the channel formed between the coil assemblies to the first end of the winding assembly, and then it crosses the first major external surface of the winding assembly to the second end. This continuation of the tape forms the second basic pattern. Since in this embodiment of the invention, the tape or strip passes through the channel formed between the coil assemblies twice, instead of winding the strip around the coils square or perpendicular to the coil conductors, as in the first embodiment of the invention, the strip may be spiralled or wound at an angle slightly offset from 90°, in order to space the strip in the channel.

For example, tape or strip 90, shown in FIGS. 2 and 3, starts at end 46 of coil assembly 24, on the major external surface of the winding assembly formed by coil assembly 24, it crosses this major external surface to end 44 of high voltage coil assembly 24, it crosses end 44 and loops through the channel formed between the coil assemblies, preferably interleaving the high-low insulation 48, it crosses end 34 of low voltage coil assembly 22 and arrives at the major external surface formed by winding tube 28, it crosses this major external surface to end 32 of winding assembly 22, it crosses end 32 of coil assembly 22, it loops through the channel formed between the coil assemblies, again preferably interleaving the high-low insulation 48, it crosses end 46 of coil assembly 46, and then crosses the major external surface formed by the outer surface of coil assembly 24. Similar to the first embodiment of the invention, the tape is bonded to the winding assembly with a suitable adhesive, with the tape being bonded to the outer surface of coil assembly 24, to the high-low insulation 48, and to the inner surface of coil assembly 22, which may in actuality be the inner surface of winding tube member 28. Also similar to the first embodiment of the invention, it will be noted that any attempt to move one coil assembly relative to the other, in any direction, will be resisted by the portion of the tape which is disposed between the coil assemblies, placing the tape in tension, which takes advantage of the great strength of tapes, such as tapes of the woven glass type, in tension.

The basic first and second patterns performed as hereinbefore described may then be repeated by other lengths of tape, such as tape 92, as many times, as necessary to obtain the desired bracing effect.

Figure 5:
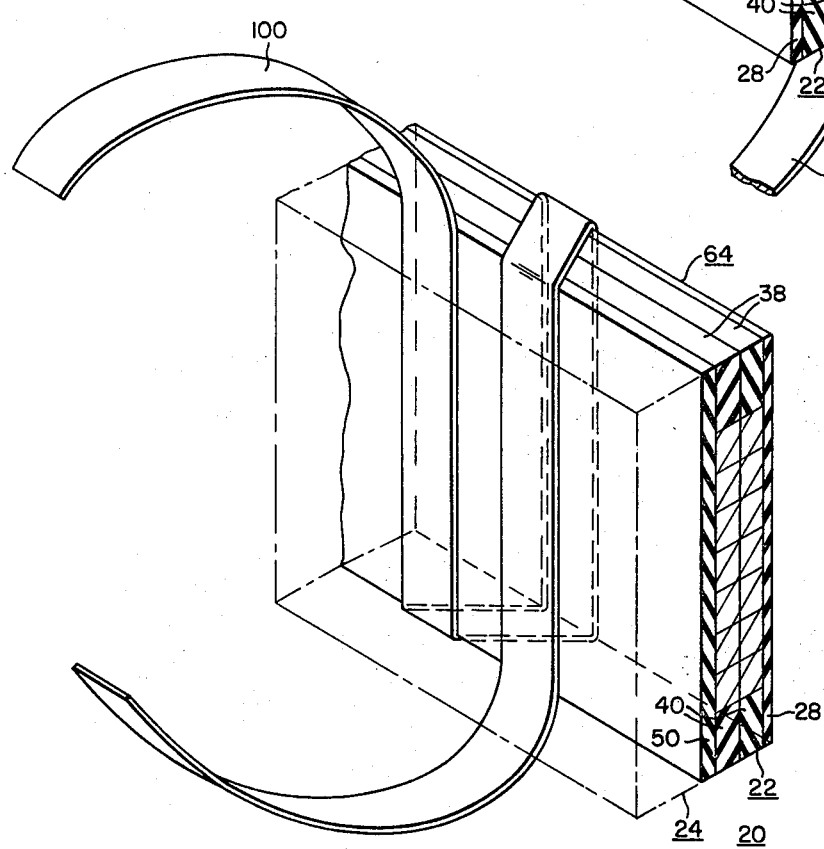
FIG. 5 is a pictorial view of a portion of the winding assembly shown in FIGS. 2 and 3, illustrating another embodiment of the invention.

This embodiment of the invention may also be easily performed. If the winding assembly is formed progressively, by winding each section upon the last wound section, after the inner or low voltage coil assembly 22 has been wound, and the first half 50 of the high-low insulation 48 placed in position, a predetermined length of tape 100 may be looped about the structure as illustrated in FIG. 5, with the back of the loop crossing winding tube 28 and the ends of the loop crossing insulating member 50 in opposite directions. The ends of the loop are then moved back out of the way and the winding assembly completed, adding the portions shown in dotted outline in FIG. 5. After the outer or high voltage coil assembly 24 has been wound, the ends of tape 100 may be looped over the outer surface of coil assembly 24 in opposite directions. This completes the assembly, except for bonding tape 100 to its immediately adjacent contacting portions of winding assembly 20, which may be accomplished by using tape which has been pre-impregnated with adhesive, which is then cured when the winding is heated to remove moisture, or the adhesive may be applied to the tape during the winding process. If winding assembly 20 is formed in subassemblies and telescoped into assembled relation, the first half of the high-low insulation 48 may be telescoped over low voltage coil assembly 22 and then tape 100 may be looped into position before the second half of high-low insulation 48 and the high voltage winding 24 are telescoped into position.

While the second embodiment of the invention uses a plurality of discrete strips of insulating material or tape to form a plurality of repeating first and second basic patterns, it will be obvious that the tape may be in the form of one long continuous strip, with the one long continuous strip forming a plurality of repeating first and second basic patterns. Continuous interleaving with one long length of tape, however, does not allow the simple pre-placement of the strip, and can only be accomplished after winding assembly 20 has been completed. Thus, ducts would be required between the coil assemblies to provide the space necessary for threading the strip of insulating material between the coil assemblies. Since the winding may be very adequately braced by using a plurality of discrete strips of insulating material, as hereinbefore described, with virtually no extra labor or cost, and without modification to the winding structure, it is preferable to perform the bracing as described in the two embodiments.

While the embodiments of the invention have been illustrated by winding structures having two coil assemblies, it will be obvious that the basic teachings may be extended to include any number of additional concentrically disposed adjacent coils. For example three separate coil assemblies are very common in transformer structures, with the inner and outer coil assemblies forming the low voltage winding, and the inner coil forming the high voltage winding. This arrangement is shown diagrammatically in FIG. 8, with the vertical component of the mechanical forces attempting to force the high voltage coil 24 and the two sections 22' and 22" of low voltage coil assembly 22 in the directions determined by the relative axial locations of their electrical centers.

Figure 8:
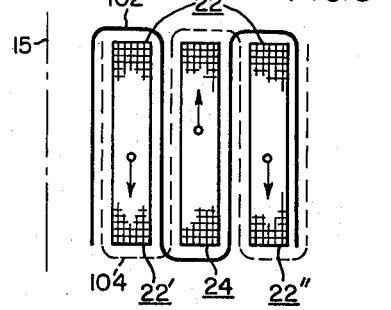
FIG. 8 is a diagrammatic representation of the embodiment of the invention shown in FIGS. 6 and 7, extended to include an additional coil assembly.

FIG. 8 also illustrates two tapes or strips of insulating material 102 and 104, interleaving the coil assemblies in a natural extension of the first basic pattern, with tape 102 being shown with a solid line and tape 104 being shown with a dotted line. When using a plurality of coils the first basic pattern starts near one end of the winding assembly, adjacent one of the major external surfaces of the winding, formed either by the outer surface of the outer coil assembly, or the inner surface of the winding tube, it crosses this major external surface to the other end of the winding, it then loops back and forth between the winding ends through successively adjacent channels formed between the plurality of coil assemblies, arriving at the other major external surface, it then crosses this major external surface to the other end of the winding. By starting alternate lengths of tapes, such as tapes 102 and 104, at opposite ends of the same major external surface, a very high strength bracing arrangement is accomplished.

The second embodiment of the invention shown on side 64 of winding assembly 20, may, by a normal extension of the first and second basic patterns, be extended to include any number of concentrically disposed coil assemblies.

A single-phase winding assembly rated 833 kva. was constructed according to the teachings of the invention, using the bracing arrangement shown on side 62 of the winding structure shown in FIG. 2. The high voltage coil was rated 11,400 volts and 73.1 amperes RMS. The low voltage coil was rated 2400 volts and 347 amperes RMS. The winding was subjected to several short circuit tests, all of which were passed successfully. The severest of the tests was 1240 amperes RMS on the high voltage coil for a duration of 232 cycles. This was 17 times the rated current. The vertical unbalance force was calculated to be approximately 17,000 pounds. Woven glass tape cemented to the winding structure with an epoxy adhesive, was used to brace the winding structure.

In summary, there has been disclosed new and improved bracing arrangements for concentrically disposed coil assemblies of electrical transformers, which prevent axial movement of the coils relative to one another during normal and short circuit conditions. The disclosed bracing arrangements are easily performed during manufacture of the winding structure, requiring very little labor and very little additional cost. Thus, the manufacturing of the winding assembly is greatly simplified over prior art assemblies, the cost of assembly is less, and the strength of the winding in resisting vertical forces has been increased, over conventional methods of bracing concentrically disposed coil assemblies.

Since numerous changes may be made in the above described apparatus and different embodiments of the invention may be made without departing from the spirit thereof, it is intended that all matter contained in the foregoing description or shown in the accompanying drawings, shall be interpreted as illustrative, and not in a limiting sense.

I claim as my invention:
1. An electrical winding assembly comprising:
   a plurality of electrical coil assemblies, each of said plurality of electrical coil assemblies having first and second ends and an opening end, said plurality of electrical coil assemblies extending between its being disposed in adjacent, concentric, spaced relation, forming an electrical winding assembly having first and second ends, first and second major opposed external surfaces, and channels formed between each adjacent pair of electrical coil assemblies.
   at least one strip of electrical insulating material, said at least one strip of electrical insulating material interleaving said plurality of electrical coil assemblies,
   adhesive means, said adhesive means bonding at least a portion of said at least one strip of electrical insulating material to said electrical winding assembly,
   said at least one strip of electrical insulating material interleaving said plurality of electrical coil assemblies in a first basic pattern which starts adjacent one of the major external surfaces near one end of the winding assembly, crosses this major external surface to the other end of the winding assembly, loop back and forth between the winding ends through successively adjacent channels formed between said spaced electrical coil assemblies, arriving at the other major external surface at one of the ends of the winding assembly, and crossing this major external surface to the other end of the winding, the portion of said at least one strip of electrical insulating material being placed in tension by forces which tend to axially separate said plurality of electrical coil assemblies.

2. The electrical winding assembly of claim 1 including first and second electrical coil assemblies adapted for use as the high and low voltage windings of an electrical transformer, respectively.

3. The electrical winding assembly of claim 1 including first, second, and third coil assemblies, with the second coil assembly being disposed between said first and third coil assemblies, said second coil assembly being adapted for use as the high voltage winding of an electrical transformer, and said first and third coil assemblies being adapted for use as the low voltage winding of the electrical transformer.

4. The electrical winding assembly of claim 1 wherein said at least one strip of electrical insulating material is continued at the completion of said first basic pattern, forming a second basic pattern which returns to the starting major external surface at one of the winding ends by looping back and forth between the winding ends through successively adjacent channels, and crossing the starting major external surface to the opposite winding end.

5. The electrical winding assembly of claim 4 wherein said at least one strip of electrical insulating material forms a plurality of connected first and second basic patterns.

6. The electrical winding assembly of claim 4 including a plurality of strips of electrical insulating material, each interleaving said winding assembly to form a first and second basic pattern.

7. The electrical winding assembly of claim 1 including at least two strips of electrical insulating material, said at least two strips of electrical insulating material each forming said first basic pattern, with one of the strips starting at one end of the winding on a predetermined external surface, and the other of said at least two strips starting on the opposite end of said winding on the same predetermined external surface.

8. The electrical winding assembly of claim 1 including insulating means disposed in each of the channels formed between each adjacent pair of said plurality of electrical coils, said at least one strip of electrical insulating material being bonded to said insulating means with said adhesive means.

9. The electrical winding assembly of claim 8 wherein said at least one strip of electrical insulating material interleaves said insulating means in each of said channels.

10. The electrical winding assembly of claim 1 including a winding tube, the inner electrical coil being disposed on said winding tube, said at least one strip of electrical insulating material being bonded to said winding tube by said adhesive means.

11. The electrical winding assembly of claim 8 including a winding tube, the inner electrical coil being disposed on said winding tube, said at least one strip of electrical insulating material being bonded to said winding tube by said adhesive means.

12. The electrical winding assembly of claim 11 wherein said at least one strip of electrical insulating material interleaves said insulating means in each of said channels.

References Cited

UNITED STATES PATENTS

| | | | |
|---|---|---|---|
| 2,180,759 | 11/1939 | Kneisley | 336—100 |
| 2,571,418 | 10/1951 | Castenschiold | 336—185 X |
| 3,237,136 | 2/1966 | Ford | 336—206 |

DARRELL L. CLAY, *Primary Examiner.*

E. GOLDBERG, *Assistant Examiner.*